United States Patent
Jung et al.

[11] Patent Number: 5,867,929
[45] Date of Patent: Feb. 9, 1999

[54] E-Z CHRISTMAS TREE WATERER

[76] Inventors: Yeoun Soo Jung; John David Jung, both of 7217-B Mimoka Ct., Honolulu, Hi. 96818

[21] Appl. No.: 777,031

[22] Filed: Dec. 30, 1996

[51] Int. Cl.[6] .............................. A47G 7/02; A47G 27/04
[52] U.S. Cl. ................................. 47/40.5; 47/79
[58] Field of Search ........................ 47/40.5, 79, 79 C, 47/79 D, 79 I, 79 N, 79 V; 200/84; 73/290 R, 307, 308, 313, 317; 340/608, 624, 566; 116/109, 110, 228

[56] References Cited

U.S. PATENT DOCUMENTS

| 5,054,236 | 10/1991 | Sands | 47/79 |
|---|---|---|---|
| 5,279,071 | 1/1994 | McDougall | 47/40.5 |
| 5,410,839 | 5/1995 | Granger | 47/79 |
| 5,473,838 | 12/1995 | Denbigh | 47/40.5 |
| 5,493,277 | 2/1996 | Pierce et al. | 47/40.5 |
| 5,513,677 | 5/1996 | McCurry | 47/40.5 |
| 5,535,547 | 7/1996 | Brunengo | 47/79 |

*Primary Examiner*—Thomas B. Will
*Assistant Examiner*—Arpad Fabian Kovacs
*Attorney, Agent, or Firm*—Michael I. Kroll

[57] ABSTRACT

An E-Z Christmas tree waterer (10) to maintain water (12) within a receptacle (14) of a stand (16) having a plurality of holding screws (18), to support a cut trunk (20) of a Christmas tree (22) in an upright position. The waterer (10) comprises a water reservoir (24) having a bottom outlet port (20) and a higher inlet port (28). An elongate conduit (30) has a first end (32) fluidly connected to the bottom outlet port (26) of the water reservoir (24) and a second end (34) extending to the receptacle (14) of the stand (16). A structure (36) is for supporting the water reservoir (24) above the receptacle (14) of the stand (16), so that the water (12) can flow from the water reservoir (24) through the elongate conduit (30) and into the receptacle (14) of the stand (16).

21 Claims, 6 Drawing Sheets

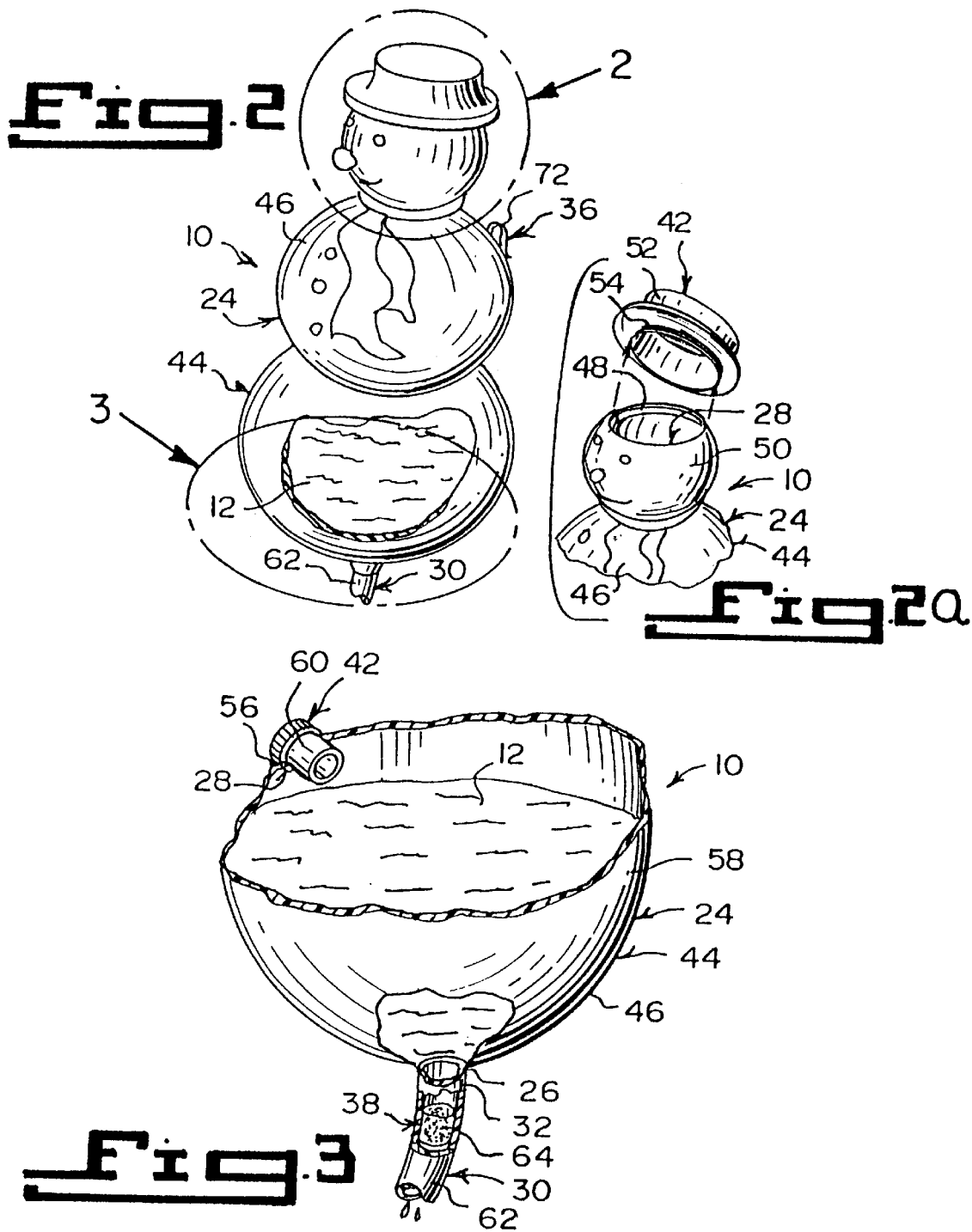

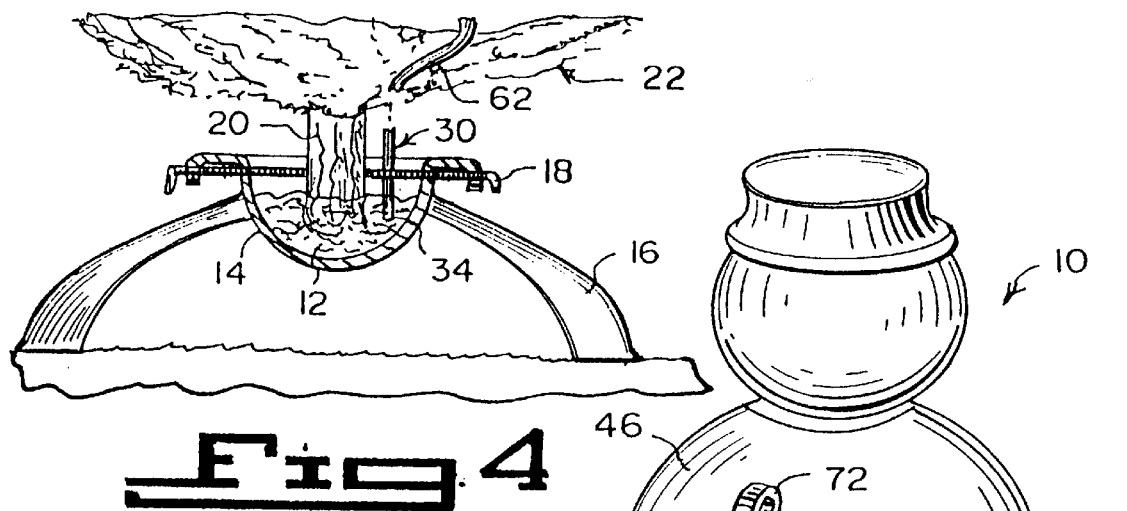
Fig. 4
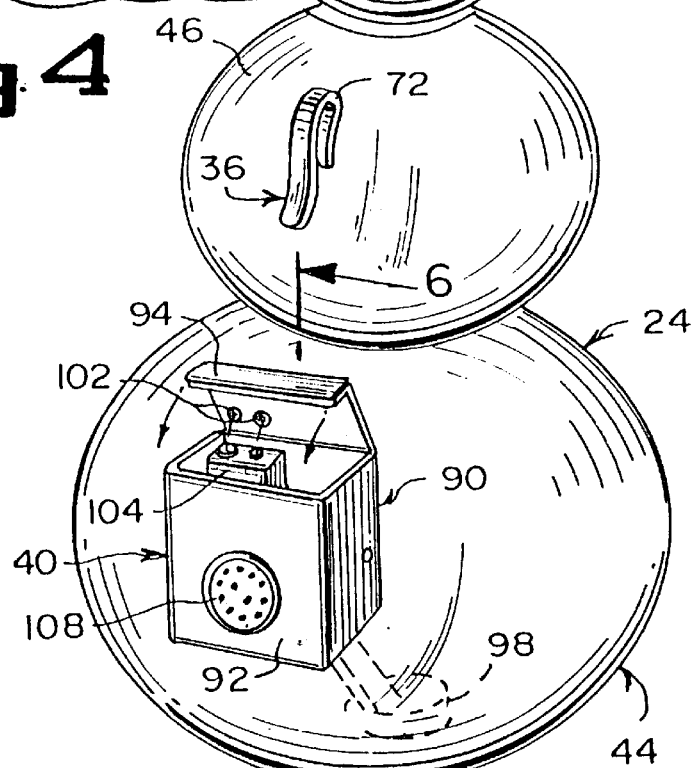
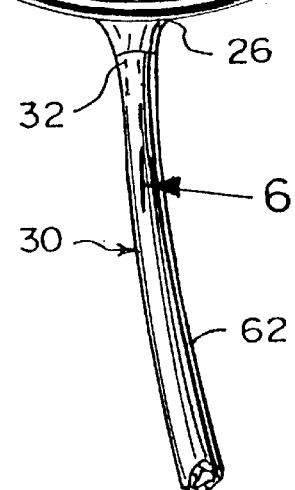
Fig. 5

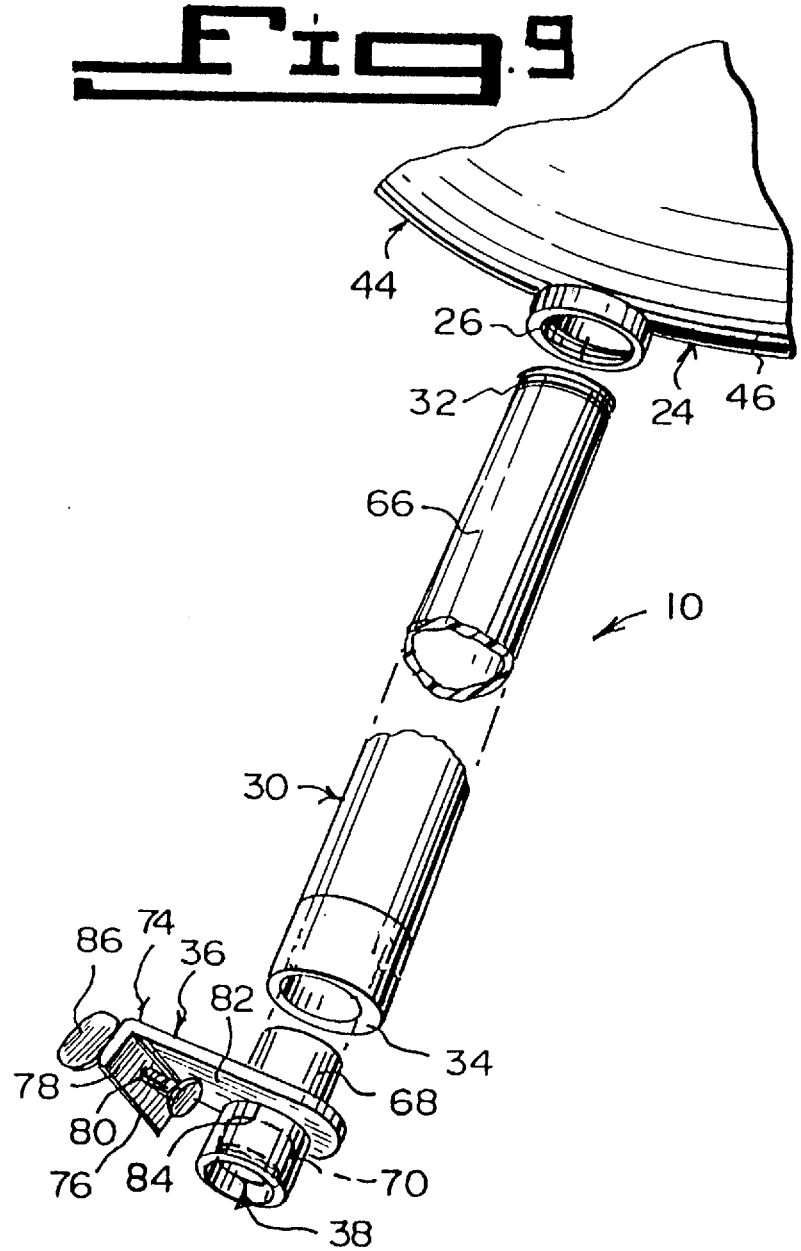

E-Z CHRISTMAS TREE WATERER

BACKGROUND OF THE INVENTION

Field of the Invention

The instant invention relates generally to watering devices and more specifically it relates to an E-Z Christmas tree waterer. The E-Z Christmas tree waterer enables a user to automatically water a Christmas tree without bending over and crawling under the Christmas tree.

Description of the Prior Art

Numerous watering devices have been provided in prior art. For example, U.S. Pat. Nos. 5,279,071 to McDougall; 5,410,839 to Granger; 5,493,277 to Pierce et al.; 5,513,677 to McCurry and 5,535,547 to Brunengo all are illustrative of such prior art. While these units may be suitable for the particular purpose to which they address, they would not be as suitable for the purposes of the present invention as heretofore described.

McDOUGALL, DALE

AUTOMATIC TREE AND/OR PLANT WATERER

U.S. Pat. No. 5,279,071

A novel automatic tree waterer is provided herein. It is adapted to be connected to a stand which holds a tree, e.g. a Christmas tree, in an upright position. The waterer includes a hollow support base and a hollow two-piece body section. The lower body section is assembled to the support base by means of a slide coupled lip/coupling support lip to be airtight and watertight. The upper body section is assembled to the lower body section by means of male/female threads to be airtight and watertight. The upper body includes a male threaded upper neck. A hat including an inner well with interlock threads is assembled to the upper body by means of the male/female threads to be airtight and watertight. A water outlet is provided from the interior of the body section. A flow controller unit is connected to the water outlet to close the water outlet to enable filling the interior of the hollow two-piece section with water. A hose is adapted to be connected between the flow controller and the stand which holds the tree. Once the flow of water is commenced, a cyclic automatic flow of water ensues. The water will not flow unless air is allowed to enter through the tube. Thus, when the end of the tube is submerged in water, no water can flow.

GRANGER, HUGH A.

CHRISTMAS TREE WATERING FUNNEL WITH INDICATING LIGHT AND FLOAT

U.S. Pat. No. 5,410,839

An apparatus for maintaining a water supply in a stand supporting a Christmas tree is provided. A rigid funnel body comprises integrally formed top, center, and bottom portions. The funnel has a frusto-conical cross-section that tapers from the top portion to the bottom portion. A flexible coupling is integrally formed between the portions of the funnel to hold them in a desired angular relationship. A light assembly is affixed to the top portion of the funnel. The light assembly includes a light source to indicate that the water supply in the stand has fallen below a desired minimum level. A float assembly is pivotally affixed to the bottom portion of the funnel and is coupled to the light assembly with a connecting member. The float assembly includes a float body that floats on the surface of the water supply to induce movement of the connecting member for energizing the light source.

PIERCE, LINDY

SNOW, NANCY L.

DEVICE FOR MONITORING THE WATER LEVEL OF A CONTAINER AND FOR ADDING WATER TO THE CONTAINER

U.S. Pat. No. 5,493,277

A Christmas tree ornament uses a water sensor that provides on demand an indication by light and/or sound if the tree needs water. A portion of the ornament contains a funnel side which allows water to be added to the tree. The other portion of the ornament contains the circuitry for the sensor. A sensor, in the form of a pair of electrodes or terminals, connected to the circuitry, is contained in the water of the Christmas tree stand. The circuitry further includes a battery, an on/off switch, a resistor, a green LED, and a red LED mounted on a display panel. In operation, when the switch is turned on, the green light is energized indicating that the battery is good (a safety feature). If the red light is not on, it is an indication the tree needs water. Water can be added through a funnel side of the ornament. When the electrodes are immersed in the water, a circuit is completed and the red light turns on to indicate sufficient water for the tree.

McCURRY O. THOMAS

REMOTE FILL RECEPTACLE

U.S. Pat. No. 5,513,677

A remote fill receptacle device is provided comprising a receptacle body and a receptacle conduit. The device is employed in conjunction with a tree stand and includes a water reservoir for conveniently filling/refilling the tree stand's water reservoir. The invention receives water additions via an inlet opening in the upper portion of the body and permits the water to gravity discharge from the body via an outlet opening in the lower portion of the body through the receptacle conduit, which directs the discharge water from the outlet opening to the water reservoir.

BRUNENGO, P. JOHN

CONDUIT AND FLOAT GAUGE APPARATUS

U.S. Pat. No. 5,535,547

A conduit and float gauge apparatus is provided for use with a tree placed in a water-retaining cup and includes a conduit unit which includes a bottom end portion that is placed in the water-retaining cup. One or more connector assemblies connect the conduit unit to the tree, such that the connector assemblies stabilize the conduit unit in a vertical orientation. A float assembly is housed within the conduit unit and includes a flotation member located within the bottom end portion of the conduit unit. The float assembly includes a riser unit connected to the flotation member. A gauge assembly is connected to a top riser portion of the riser unit. The conduit unit has a linear length sufficient to permit a person to add water to the top end portion of the conduit unit without bending down, getting on one's knees, or sitting down on a floor. The bottom end portion of the conduit unit and an intermediate portion of the conduit unit are oriented with respect to each other at an obtuse angle. A guide assembly is connected to a topmost portion of the top end portion of the conduit unit. The guide assembly receives and guides motion of the gauge assembly when water levels in the water-retaining cup rise and fall. The guide assembly includes a gauge-receiving aperture and a water-inlet aperture.

SUMMARY OF THE INVENTION

A primary object of the present invention is to provide an E-Z Christmas tree waterer that will overcome the shortcomings of the prior art devices.

Another object is to provide an E-Z Christmas tree waterer that will enable a user of the invention to automatically water a Christmas tree without having to bend over and crawl under the Christmas tree to accomplish the watering.

An additional object is to provide an E-Z Christmas tree waterer that contains a battery operated float activated alarm unit to indicate that a water reservoir is empty and water will not drain into a tree stand.

A further object is to provide an E-Z Christmas tree waterer that is simple and easy to use.

A still further object is to provide an E-Z Christmas tree waterer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is a side perspective view of the first embodiment with parts broken away and in section.

FIG. 2a is a side perspective view of a portion of FIG. 2 as indicated by arrow 2, showing a first filler cap exploded therefrom.

FIG. 3 is a side perspective view of a portion of FIG. 2 with parts broken away and in section as indicated by arrow 3, showing a second filler cap thereon and a first check valve.

FIG. 4 is a cross sectional view taken along line 4—4 in FIG. 1 with parts broken away.

FIG. 5 is a rear perspective view of a second embodiment of the instant invention, showing a float activated audio alarm unit therein.

FIG. 9 is an exploded bottom perspective view taken in the direction of arrow 9 in FIG. 8 with parts broken away.

Similar reference characters denote corresponding features consistently throughout the attached drawings.

DETAILED DESCRIPTION OF THE PREFERRED EMBODIMENTS

Figure 1:
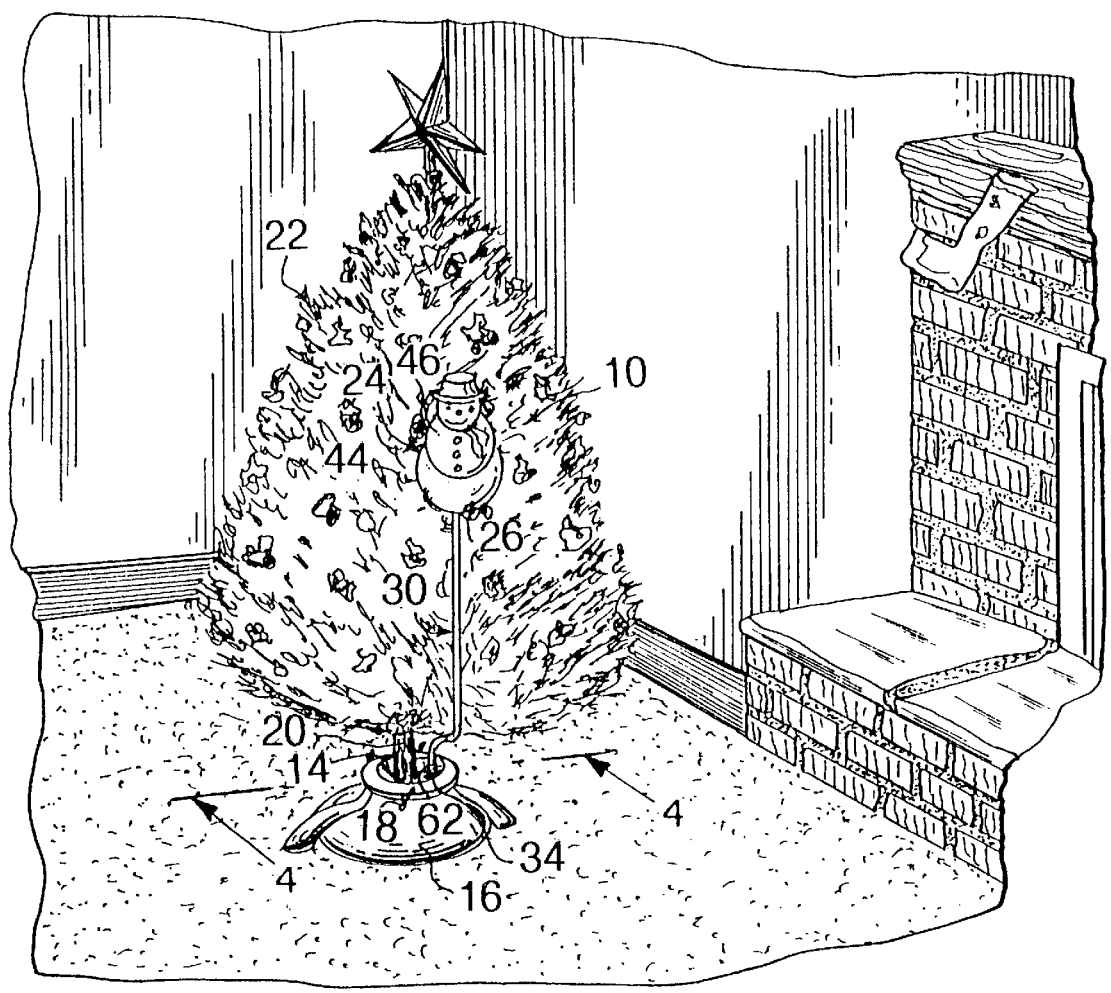
FIG. 1 is a front perspective view of a first embodiment of the instant invention secured to a Christmas tree.

Turning now descriptively to the drawings, in which similar reference characters denote similar elements throughout the several views, FIGS. 1 to 9 illustrate an E-Z Christmas tree waterer 10 to maintain water 12 within a receptacle 14 of a stand 16 having a plurality of holding screws 18, to support a cut trunk 20 of a Christmas tree 22 in an upright position. The waterer 10 comprises a water reservoir 24 having a bottom outlet port 26 and a higher inlet port 28. An elongate conduit 30 has a first end 32 fluidly connected 40 the bottom outlet port 26 of the water reservoir 24 and a second end 34 extending to the receptacle 14 of the stand 16. A structure 36 is for supporting the water reservoir 24 above the receptacle 14 of the stand 16, so that the water 12 can flow from the water reservoir 24 through the elongate conduit 30 and into the receptacle 14 of the stand 16.

A component 38 is for controlling the flow of the water 12 through the elongate conduit 30 and into the receptacle 14 of the stand 16. An assembly 40 is for indicating that the water reservoir 24 is empty. An element 42 is for sealing the inlet port 28 in a removable manner after the water 12 is deposited into the water reservoir 24.

The water reservoir 24 is a hollow Christmas ornament 44 capable of holding a supply of water 12 therein. The hollow Christmas ornament 44 is personified as a snowman 46.

The inlet port 28, as shown in FIG. 2a, is an internally threaded aperture 48 in the top of the head 50 of the snowman 46. The sealing element 42 is a filler cap personified as a hat 52 having an externally threaded collar 54 that engages with the internally threaded aperture 48 in the top of the head 50 of the snowman 46. In FIG. 3, the inlet port 28 is in an opening 56 in the body 58 of the snowman 46. The sealing element 42 is a filler cap 60 that fits within the opening 56 in the body 58 of the snowman 46.

Figure 8:
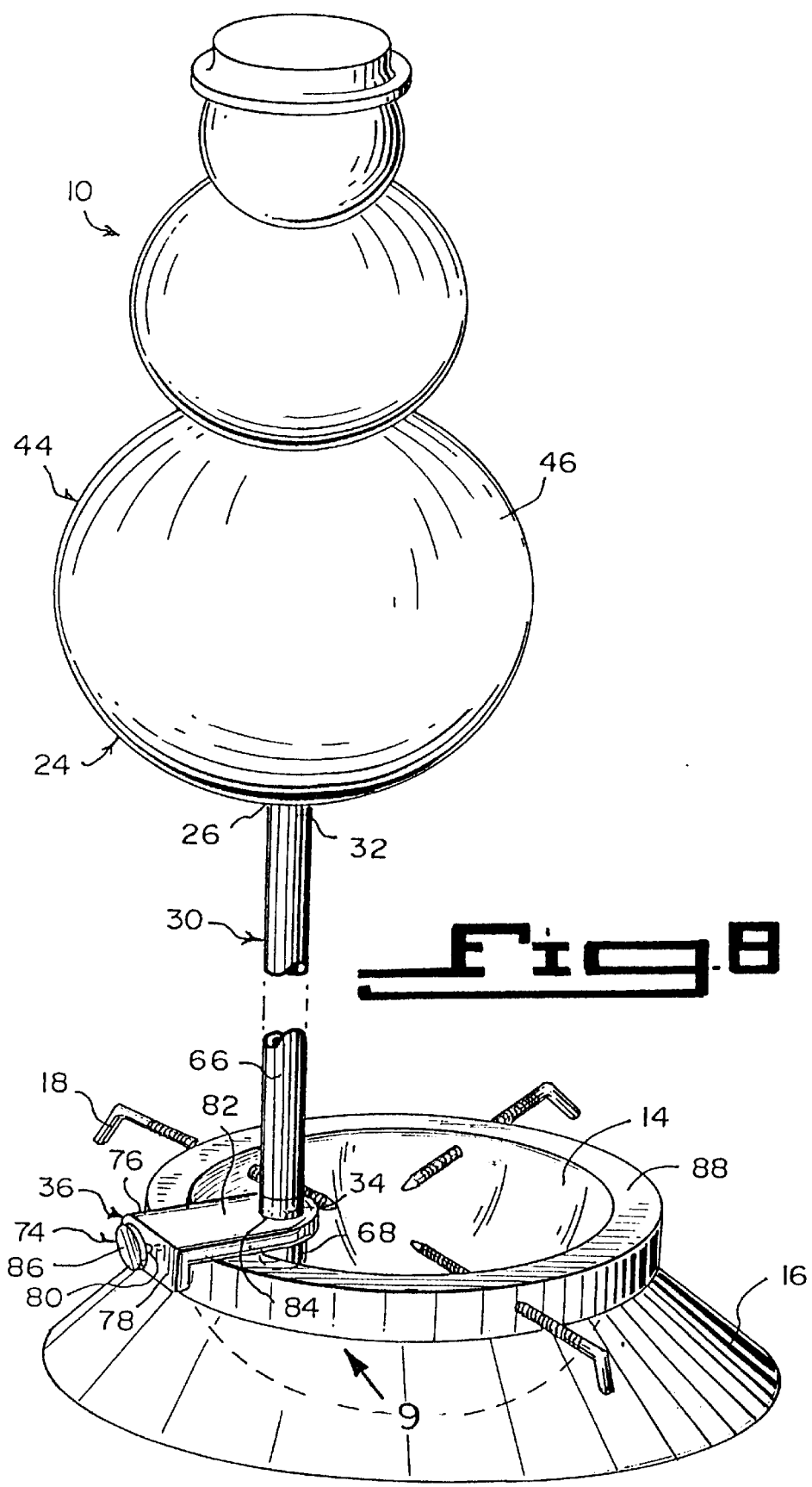
FIG. 8 is a rear perspective view of a third embodiment of the instant invention installed onto the rim of the tree stand with parts broken away.

The elongate conduit 30 in FIGS. 1 to 6, is a flexible drain tube 62. The flow controlling component 38 shown in FIG. 3, is a sponge 64 fitted into the flexible drain tube 62. The sponge 64 functions as a check valve, to allow the water 12 to slowly pass through the flexible drain tube 62 into the receptacle 14 of the stand 16. The elongate conduit 30 in FIGS. 8 and 9, is a rigid drain tube 66. The flow controlling component 38 is a sleeve 68 with a flotation check valve 70 carried in the sleeve 68, which extends out from a bottom end of the rigid drain tube 66.

The supporting structure 36, shown in FIGS. 2 and 5, is a clip 72 attached to the water reservoir 24, so that the clip 72 can hook the water reservoir 24 onto a branch of the Christmas tree 22. The supporting structure 36, shown in FIGS. 8 and 9, is a clamp assembly 74 which includes an L-shaped bracket 76, having a short arm 78 with a threaded aperture 80 therethrough and a long arm 82 with an opening 84 therethrough. The opening 84 of the long arm 82 fits onto the sleeve 68 extending out from the bottom end of the rigid drain tube 66. A thumbscrew 86 extends through the threaded aperture 80 in the short arm 78 of the L-shaped bracket 76. When the L-shaped bracket 76 is placed upon a rim 88 of the receptacle 14 of the stand 16 and the thumbscrew 86 tightened, the L-shaped bracket 76 will maintain the rigid drain tube 66 in a stationary position with the water reservoir 24 elevated above.

Figure 6:
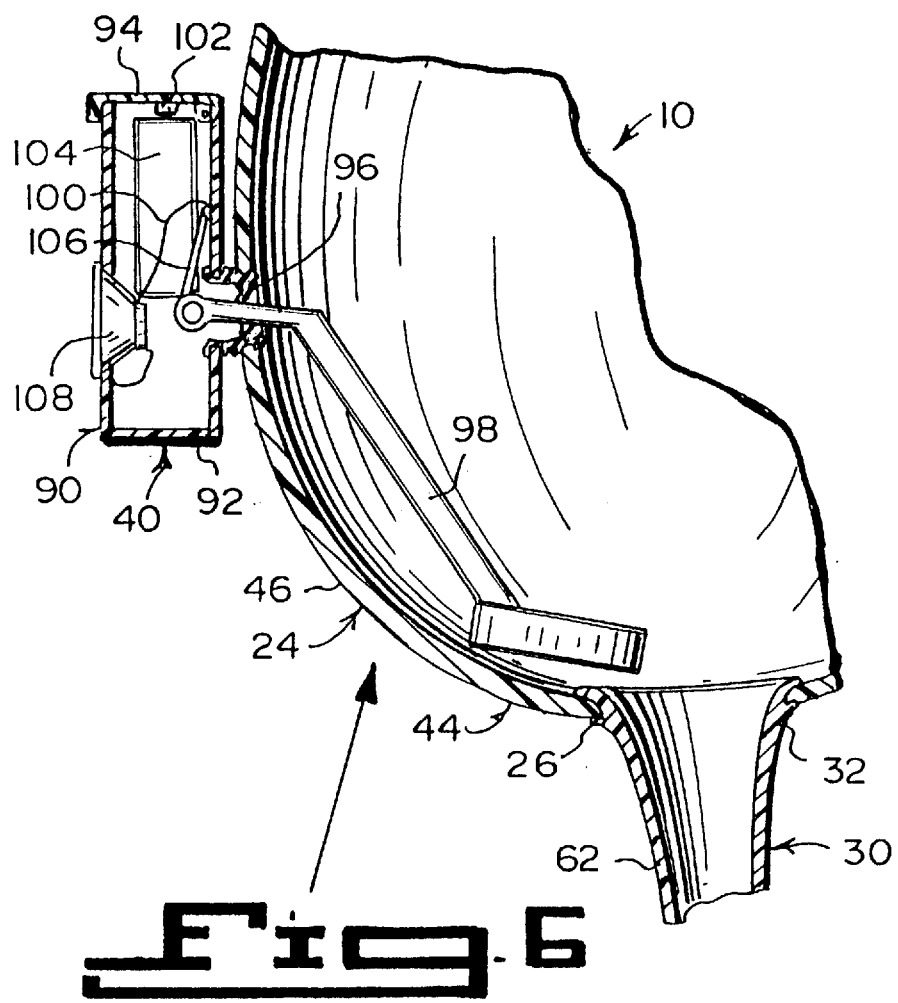
FIG. 6 is a cross sectional view taken along line 6—6 in FIG. 5, showing the interior structure of the float activated audio alarm unit.
Figure 7:
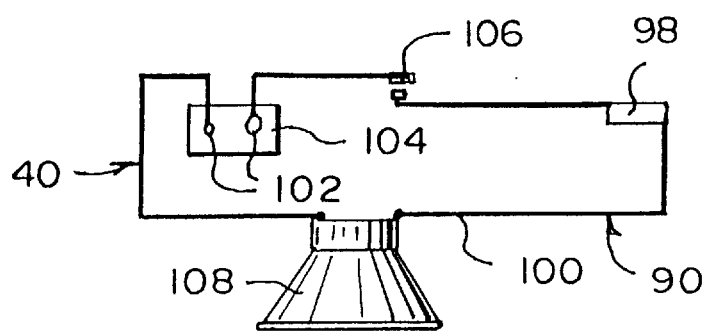
FIG. 7 is a diagrammatic schematic of the electrical circuit of the float activated audio alarm unit.

The indicating assembly 40, as shown in FIGS. 5, 6 and 7, is an alarm unit 90 that consists of a case 92 having a hinged lid 94. A flexible seal 96 attaches the case 92 onto one side of the water reservoir 24. A float sensor 98 is pivotally connected in the case 92 and extends through the flexible seal 96 into the water reservoir 24. An electric circuit 100 within the case 92 has a pair of contacts 102 in the lid 94. A battery 104 is carried in the case 92 and is electrically connected to the contacts 102, when the lid 94 is closed onto the case 92. A normally opened switch 106 is carried in the case 92 and is electrically connected between the battery 104 and the float sensor 98 in the electric circuit 100. A horn 108 is carried on the case 92 and is electrically connected to the electric circuit 100. When the water reservoir 24 is empty, the float sensor 98 will pivot to close the switch 106 and cause the horn 108 to make an audible sound.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed:

1. An E-Z Christmas tree waterer to maintain water within a receptacle of a stand having a plurality of holding screws to support a cut trunk of a Christmas tree in an upright position, said waterer comprising:
   a) a water reservoir having a bottom outlet port and a higher inlet port;
   b) an elongate conduit having a first end fluidly connected to said bottom outlet port of said water reservoir and a second end extending to the receptacle of the stand; and
   c) means for supporting said water reservoir above the receptacle of the stand, so that the water can flow from said water reservoir through said elongate conduit and into the receptacle of the stand; and
   d) means for controlling the flow of the water through said elongate conduit and into the receptacle of the stand, wherein said elongate conduit is a flexible drain tube, while said flow controlling means is a sponge fitted into said flexible drain tube, whereby said sponge functions as a check valve to allow the water to slowly pass through said flexible drain tube into the receptacle of the stand.

2. An E-Z Christmas tree waterer as recited in claim 1, further including means for indicating that said water reservoir is empty.

3. An E-Z Christmas tree waterer as recited in claim 1, further including means for sealing said inlet port in a removable manner after the water is deposited into said water reservoir.

4. An E-Z Christmas tree waterer as recited in claim 3, wherein said water reservoir is a hollow Christmas ornament capable of holding a supply of water therein.

5. An E-Z Christmas tree waterer as recited in claim 4, wherein said hollow Christmas ornament is personified as a snowman.

6. An E-Z Christmas tree waterer as recited in claim 5, wherein said inlet port is an internally threaded aperture in the top of the head of said snowman, while said sealing means is a filler cap personified as a hat having an externally threaded collar that engages with said internally threaded aperture in the top of the head of said snowman.

7. An E-Z Christmas tree waterer as recited in 5, wherein said inlet port is in an opening in the body of said snowman, while said sealing means is a filler cap that fits within said opening in the body of said snowman.

8. An E-Z Christmas tree waterer as recited in 1, wherein said elongate conduit is a rigid drain tube, while said flow controlling means is a sleeve with a flotation check valve carried in said sleeve, which extends out from a bottom end of said rigid drain tube.

9. An E-Z Christmas tree waterer as recited in 8, wherein said supporting means is a clamp assembly which includes:
   a) an L-shaped bracket having a short arm with a threaded aperture therethrough and a long arm with an opening therethrough, said opening of said long arm fits onto said sleeve extending out from said bottom end of said rigid drain tube; and
   b) a thumbscrew extending through said threaded aperture in said short arm of said L-shaped bracket, so that when said L-shaped bracket is placed upon a rim of the receptacle of the stand and said thumbscrew is tightened, said L-shaped bracket will maintain said rigid drain tube in a stationary position with said water reservoir elevated above.

10. An E-Z Christmas tree waterer as recited in 1, wherein said supporting means is a clip attached to said water reservoir, so that said clip can hook said water reservoir onto a branch of the Christmas tree.

11. An E-Z Christmas tree waterer as recited in claim 2, wherein said indicating means is an alarm unit that includes:
   a) a case having a hinged lid;
   b) a flexible seal to attach said case onto one side of said water reservoir;
   c) a float sensor pivotally connected in said case and extending through said flexible seal into said water reservoir;
   d) an electric circuit within said case having a pair of contacts in said lid;
   e) a battery carried in said case and electrically connected to said contacts when said lid is closed onto said case;
   f) a normally opened switch carried in said case and electrically connected between said battery and said float sensor in said electric circuit; and
   g) a horn carried on said case and electrically connected to said electric circuit, so that when said water reservoir is empty said float sensor will pivot to close said switch and cause said horn to make an audible sound.

12. An E-Z Christmas tree waterer as recited in claim 2, further including means for sealing said inlet port in a removable manner after the water is deposited into said water reservoir.

13. An E-Z Christmas tree waterer as recited in claim 12, wherein said water reservoir is a hollow Christmas ornament capable of holding a supply of water therein.

14. An E-Z Christmas tree waterer as recited in claim 13, wherein said hollow Christmas ornament is personified as a snowman.

15. An E-Z Christmas tree waterer as recited in claim 6, wherein said inlet port is an internally threaded aperture in the top of the head of said snowman, while said sealing means is a filler cap personified as a hat having an externally threaded collar that engages with said internally threaded aperture in the top of the head of said snowman.

16. An E-Z Christmas tree waterer as recited in 14, wherein said inlet port is in an opening in the body of said snowman, while said sealing means is a filler cap that fits within said opening in the body of said snowman.

17. An E-Z Christmas tree waterer as recited in 14, wherein said elongate conduit is a flexible drain tube, while said flow controlling means is a sponge fitted into said flexible drain tube, whereby said sponge functions as a check valve to allow the water to slowly pass through said flexible drain tube into the receptacle of the stand.

18. An E-Z Christmas tree waterer as recited in 17, wherein said supporting means is a clip attached to said water reservoir, so that said clip can hook said water reservoir onto a branch of the Christmas tree.

19. An E-Z Christmas tree waterer as recited in claim 17, wherein said indicating means is an alarm unit that includes:
   a) a case having a hinged lid;
   b) a flexible seal to attach said case onto one side of said water reservoir;
   c) a float sensor pivotally connected in said case and extending through said flexible seal into said water reservoir;
   d) an electric circuit within said case having a pair of contacts in said lid;
   e) a battery carried in said case and electrically connected to said contacts when said lid is closed onto said case;
   f) a normally opened switch carried in said case and electrically connected between said battery and said float sensor in said electric circuit; and
   g) a horn carried on said case and electrically connected to said electric circuit, so that when said water reservoir is empty said float sensor will pivot to close said switch and cause said horn to make an audible sound.

20. An E-Z Christmas tree waterer as recited in 16, wherein said elongate conduit is a rigid drain tube, while said flow controlling means is a sleeve with a flotation check valve carried in said sleeve, which extends out from a bottom end of said rigid drain tube.

21. An E-Z Christmas tree waterer as recited in 20, wherein said supporting means is a clamp assembly which includes:
   a) an L-shaped bracket having a short arm with a threaded aperture therethrough and a long arm with an opening therethrough, said opening of said long arm fits onto said sleeve extending out from said bottom end of said rigid drain tube; and
   b) a thumbscrew extending through said threaded aperture in said short arm of said L-shaped bracket, so that when said L-shaped bracket is placed upon a rim of the receptacle of the stand and said thumbscrew is tightened, said L-shaped bracket will maintain said rigid drain tube in a stationary position with said water reservoir elevated above.

\* \* \* \* \*